(12) United States Patent
Pal et al.

(10) Patent No.: US 11,970,993 B2
(45) Date of Patent: Apr. 30, 2024

(54) ENGINE WITH ROTATING DETONATION COMBUSTION SYSTEM

(71) Applicant: General Electric Company, Schenectady, NY (US)

(72) Inventors: Sibtosh Pal, Mason, OH (US); Steven Clayton Vise, Loveland, OH (US); Arthur Wesley Johnson, Cincinnati, OH (US); Clayton Stuart Cooper, Loveland, OH (US); Joseph Zelina, Waynesville, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/935,646

(22) Filed: Sep. 27, 2022

(65) Prior Publication Data

US 2023/0020803 A1    Jan. 19, 2023

Related U.S. Application Data

(62) Division of application No. 15/904,991, filed on Feb. 26, 2018, now Pat. No. 11,473,780.

(51) Int. Cl.
  *F02K 7/10*    (2006.01)
  *F02K 7/08*    (2006.01)
  (Continued)

(52) U.S. Cl.
  CPC .................. *F02K 7/10* (2013.01); *F02K 7/08* (2013.01); *F02K 7/16* (2013.01); *F23R 7/00* (2013.01);
  (Continued)

(58) Field of Classification Search
  CPC ...... F23R 3/18; F23R 7/00; F23R 3/34; F02K 7/08; F02K 7/10; F05D 2220/10; F05D 2250/90
  See application file for complete search history.

(56) References Cited

U.S. PATENT DOCUMENTS

| 2,443,186 A | 6/1948 | Foulks |
| 2,515,644 A | 7/1950 | Goddard |

(Continued)

FOREIGN PATENT DOCUMENTS

| CN | 101975122 A | 2/2011 |
| CN | 102588145 A | 7/2012 |

(Continued)

OTHER PUBLICATIONS

Rankin et al. "Overview of Performance, Application, and Analysis of Rotating Detonation Engine Technologies" Journal of Propulsion and Power, vol. 33, No. 1, Jan.-Feb. 2017, pp. 131-143 (Year: 2017) [Cited in Parent].

(Continued)

*Primary Examiner* — Ted Kim
(74) *Attorney, Agent, or Firm* — Venable LLP; Edward Kmett; Michele V. Frank

(57) ABSTRACT

A Brayton cycle engine and method for operation. The engine includes an inner wall assembly and an upstream wall assembly each extended from a longitudinal wall into a gas flowpath. An actuator adjusts a depth of the detonation combustion region into the gas flowpath between the inner wall assembly and the upstream wall assembly. The engine flows an oxidizer through the gas flowpath and the inner wall captures a portion of the oxidizer. The engine further adjusts the captured flow of oxidizer via the upstream wall and flows a first flow of fuel to the captured flow of oxidizer to produce rotating detonation gases. The engine flows the detonation gases downstream and to mix with the flow of oxidizer, and flows and burns a second flow of fuel to the detonation gases/oxidizer mixture to produce thrust.

18 Claims, 12 Drawing Sheets

(51) Int. Cl.
  *F02K 7/16*   (2006.01)
  *F23R 3/18*   (2006.01)
  *F23R 7/00*   (2006.01)
  *F23R 3/34*   (2006.01)

(52) U.S. Cl.
  CPC ...... *F05D 2220/10* (2013.01); *F05D 2250/90* (2013.01); *F23R 3/18* (2013.01); *F23R 3/34* (2013.01)

(56) References Cited

U.S. PATENT DOCUMENTS

| | | | |
|---|---|---|---|
| 2,580,908 | A | 1/1952 | Goddard |
| 2,612,021 | A | 9/1952 | Zulm |
| 2,834,181 | A | 5/1958 | Paris et al. |
| 2,952,123 | A | 9/1960 | Rich |
| 2,966,028 | A * | 12/1960 | Johnson ............ F02C 7/042 415/181 |
| 2,984,305 | A | 5/1961 | Ranson |
| 3,240,010 | A | 3/1966 | Morrison |
| 3,514,955 | A | 6/1970 | Paulson et al. |
| 3,603,094 | A | 9/1971 | Townend |
| 3,659,422 | A * | 5/1972 | Hope ............ F02K 1/1207 60/224 |
| 3,864,907 | A | 2/1975 | Curran |
| 4,369,920 | A | 1/1983 | Schmidt |
| 4,455,839 | A * | 6/1984 | Wuchter ............ F23R 3/58 60/737 |
| 4,821,512 | A | 4/1989 | Guile et al. |
| 5,381,655 | A | 1/1995 | Orlando et al. |
| 5,901,550 | A | 5/1999 | Bussing et al. |
| 7,328,571 | B2 | 2/2008 | Drake et al. |
| 7,669,405 | B2 | 3/2010 | Pinard et al. |
| 7,784,267 | B2 | 8/2010 | Tobita et al. |
| 7,797,943 | B2 | 9/2010 | Bulman |
| 7,937,945 | B2 | 5/2011 | Kinde, Sr. |
| 7,950,219 | B2 | 5/2011 | Tangirala et al. |
| 8,082,728 | B2 | 12/2011 | Murrow et al. |
| 8,443,583 | B2 | 5/2013 | Nalim et al. |
| 8,539,752 | B2 | 9/2013 | Brumberg et al. |
| 8,544,280 | B2 | 10/2013 | Lu et al. |
| 8,549,862 | B2 * | 10/2013 | Kendrick ............ F23R 3/286 60/737 |
| 8,650,856 | B2 | 2/2014 | Brumberg et al. |
| 8,881,500 | B2 | 11/2014 | Gutmark et al. |
| 8,893,467 | B2 | 11/2014 | Nalim et al. |
| 9,027,324 | B2 | 5/2015 | Snyder |
| 9,512,805 | B2 | 12/2016 | Snyder |
| 9,556,794 | B2 | 1/2017 | Falempin et al. |
| 2002/0112482 | A1 | 8/2002 | Johnson et al. |
| 2003/0070417 | A1 | 4/2003 | Plumpe |
| 2011/0005193 | A1 | 1/2011 | Pavia et al. |
| 2012/0131901 | A1 | 5/2012 | Westervelt et al. |
| 2012/0288359 | A1 | 11/2012 | Pichel |
| 2013/0177392 | A1 | 7/2013 | Rupp et al. |
| 2014/0090359 | A1 | 4/2014 | Jodet et al. |
| 2016/0290143 | A1 | 10/2016 | Da Costa Vinha et al. |
| 2017/0009665 | A1 | 1/2017 | Ueno et al. |

FOREIGN PATENT DOCUMENTS

| | | |
|---|---|---|
| GB | 1069217 A | 5/1967 |
| JP | S5741431 A | 3/1982 |

OTHER PUBLICATIONS

Nakayama et al. "Stable detonation wave propagation in rectangular-cross-section curved channels" Combustion and Flame vol. 159, Issue 2, Feb. 2012, pp. 859-869 (Year: 2012) [Cited in Parent].

Lu et al. "Rotating Detonation Wave Propulsion: Experimental Challenges, Modeling, and Engine Concepts", Journal of Propulsion and Power, vol. 30, No. 5, Sep.-Oct. 2014, pp. 1125-1142 (Year: 2014) [Cited in Parent].

Boening et al. "Design and Experiments of a Continuous Rotating Detonation Engine: a Spinning Wave Generator and Modulated Fuel-Oxidizer Mixing." 52nd AIAA/SAE/ASEE Joint propulsion conference, Salt Lake City, UT (2016), 10.2514/6.2016-4966, pp. 1-15 (Year: 2016) [Cited in Parent].

\* cited by examiner

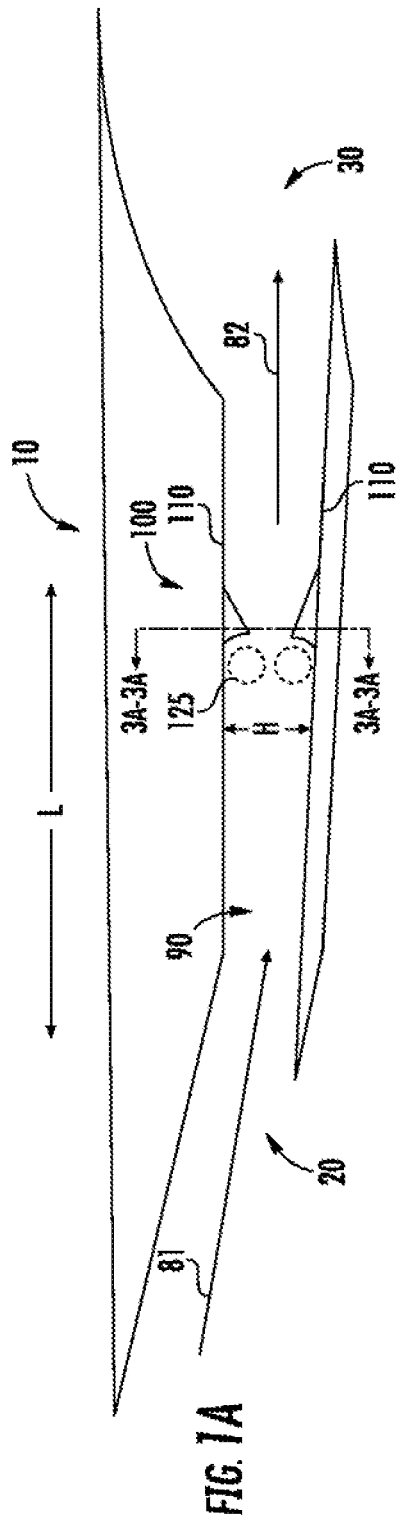
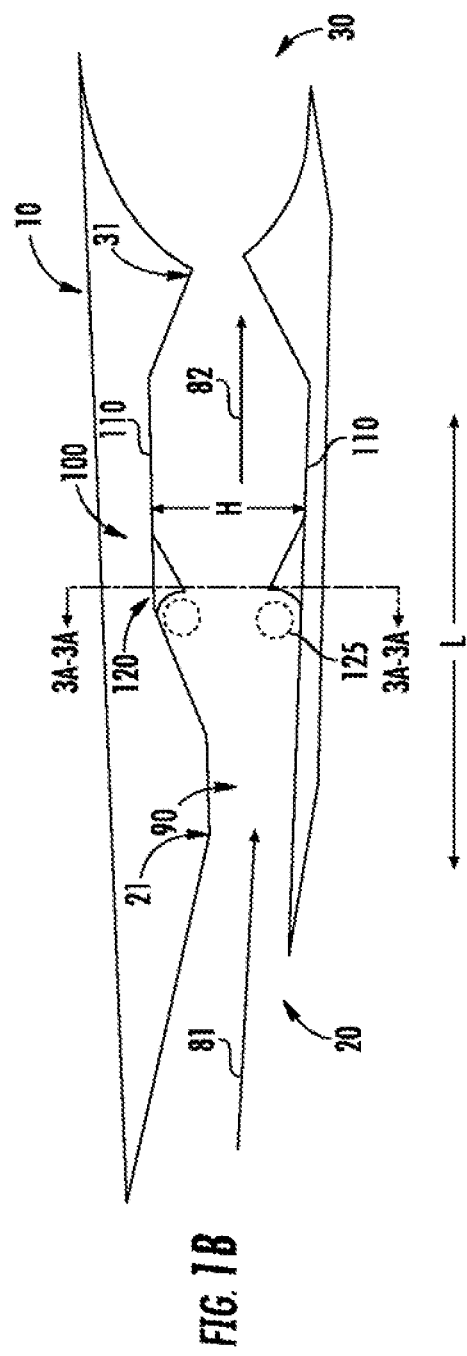

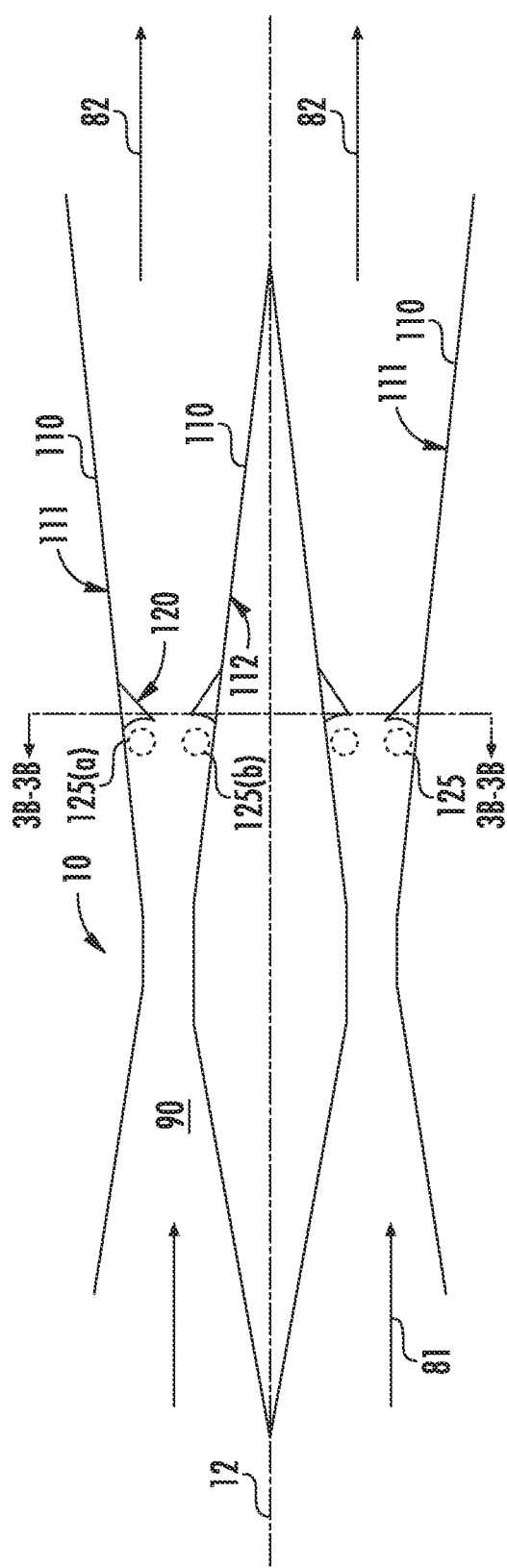
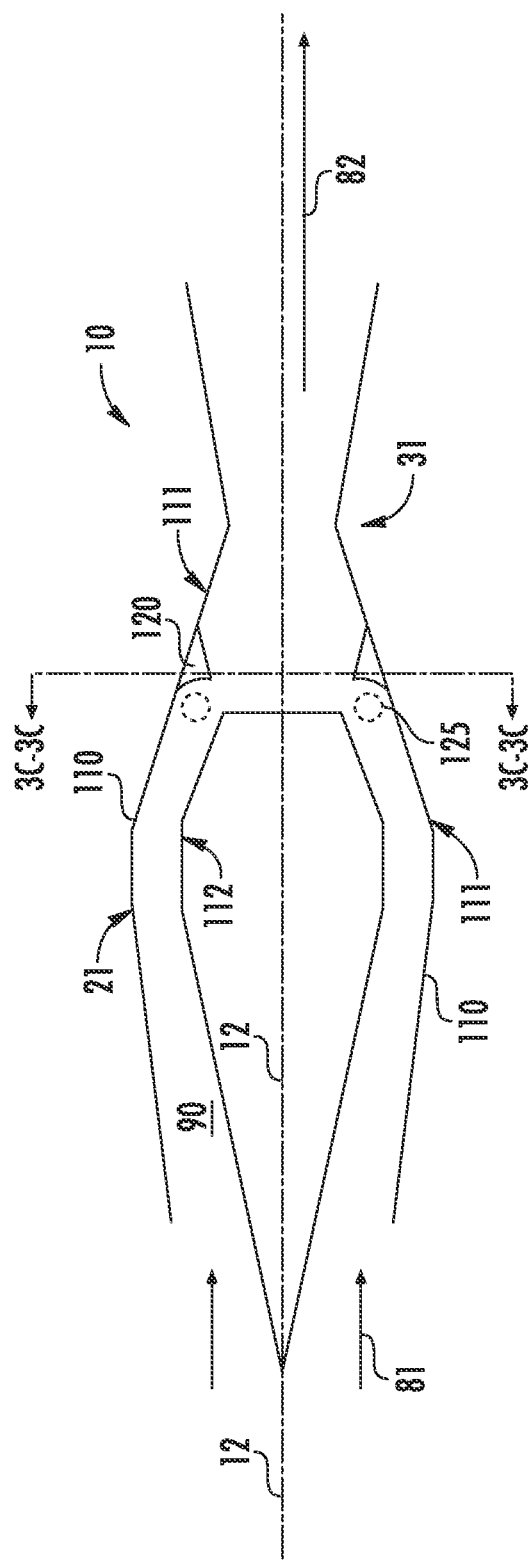

ENGINE WITH ROTATING DETONATION COMBUSTION SYSTEM

CROSS-REFERENCE TO RELATED APPLICATIONS

This application is a divisional of U.S. patent application Ser. No. 15/904,991 filed on Feb. 26, 2018, now U.S. Pat. No. 11,473,780, the contents of which are hereby incorporated by reference in their entirety.

FIELD

The present subject matter is related to continuous detonation combustion systems for Brayton cycle machines.

BACKGROUND

Propulsion systems, including gas turbines, ramjets, and scramjets, often use deflagrative combustion systems to burn a fuel/oxidizer mixture to produce combustion gases that are expanded and released to produce thrust. While such propulsion systems have reached a high level of thermodynamic efficiency through steady improvements in component efficiencies and increases in pressure ratio and peak temperatures, further improvements are nonetheless welcome in the art.

More particularly, further improvements are desired in stabilization of the combustion process generally. More specifically, further improvements are desired for combustion systems applied in gas turbine augmentor/afterburner or inter-turbine burner systems, ramjets, and scramjets.

BRIEF DESCRIPTION

Aspects and advantages of the invention will be set forth in part in the following description, or may be obvious from the description, or may be learned through practice of the invention.

The present disclosure is directed to a Brayton cycle engine and method for operation. The engine includes a longitudinal wall extended along a lengthwise direction defining a gas flowpath of the engine. An inner wall assembly is extended from the longitudinal wall into the gas flowpath. The inner wall assembly defines a detonation combustion region in the gas flowpath upstream of the inner wall assembly. An upstream wall assembly is coupled to the longitudinal wall upstream of the inner wall assembly. Various embodiments include an actuator configured to adjust a cross sectional area of the gas flowpath. The actuator adjusts a depth of the detonation combustion region into the gas flowpath. In one embodiment, the actuator is coupled to the upstream wall assembly and the actuator adjusts the depth of the upstream wall assembly in the gas flowpath. The method for operating the engine includes flowing an oxidizer through a gas flowpath into a combustion section; capturing a portion of the flow of oxidizer via an inner wall extended into a depth of the gas flowpath; adjusting the flow of oxidizer to the inner wall via an upstream wall disposed upstream of the inner wall; flowing a first flow of fuel to the portion of the flow of oxidizer captured via the wall; producing a rotating detonation wave of detonation gases via a mixture of the first flow of fuel and the portion of oxidizer upstream of the inner wall; flowing at least a portion of the detonation gases downstream and mixing the detonation gases with the flow of oxidizer; flowing a second flow of fuel to the mixture of detonation gases and the flow of oxidizer; and burning the mixture of the second flow of fuel, the detonation gases, and the flow of oxidizer to produce thrust.

In various embodiments, adjusting the flow of oxidizer to the inner wall is based at least on an operating condition of the engine. In one embodiment, the operating condition of the engine is based at least on a pressure, temperature, or flow rate of the flow of oxidizer at the combustion section.

In one embodiment, adjusting the flow of oxidizer is based at least on a desired minimum number of detonation cells to produce the rotating detonation wave.

In various embodiments, adjusting the flow of oxidizer further includes adjusting a cross sectional area of the gas flowpath based on an operating condition of the engine. In one embodiment, adjusting the cross sectional area of the gas flowpath includes adjusting a depth into the gas flowpath of the upstream wall based at least on an operating condition of the engine.

In one embodiment, burning the mixture of the second flow of fuel, the detonation gases, and the flow of oxidizer to produce thrust comprises a deflagrative combustion process.

In various embodiments, the flow of oxidizer at the combustion section defines a supersonic axial velocity through the gas flowpath producing an oblique shockwave from the flow of oxidizer in the gas flowpath. In one embodiment, the method for operating the engine further includes adjusting a profile of the oblique shockwave based on an operating condition of the engine. In one embodiment, adjusting the profile of the oblique shockwave includes adjusting a depth into the gas flowpath of the upstream wall.

In one embodiment, the detonation combustion region is defined along the lengthwise direction between the upstream wall assembly and the inner wall assembly.

In another embodiment, the engine defines a supersonic combustion ramjet engine.

In various embodiments, the inner wall assembly includes an upstream face extended from the longitudinal wall into the gas flowpath, and a downstream face extended from the longitudinal wall and coupled to the upstream face in the gas flowpath. The downstream face is disposed at an angle relative to the longitudinal wall. In one embodiment, the actuator adjusts the angle of the downstream face relative to the longitudinal wall. In another embodiment, the downstream face of the inner wall assembly defines the second fuel injection port providing a second flow of fuel downstream of the detonation combustion region. In still another embodiment, the upstream face of the inner wall assembly defines the first fuel injection port providing a first flow of fuel to the detonation combustion region.

In various embodiments, the longitudinal wall defines the first fuel injection port providing a first flow of fuel to the detonation combustion region.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 1A-1B are lengthwise cross sectional views of exemplary embodiments of a two dimensional configuration engine according to an aspect of the present disclosure;

FIGS. 2A-2B are lengthwise cross sectional views of exemplary embodiments of an axisymmetric configuration engine according to an aspect of the present disclosure;

Figure 3A:
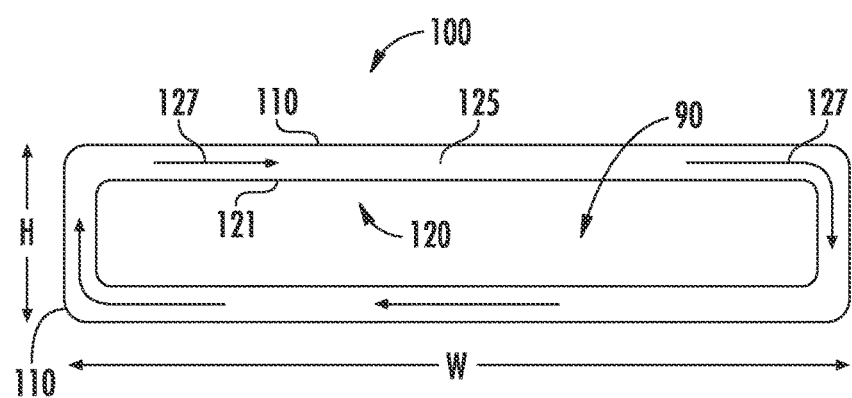
FIG. 3A is a cross sectional view of an exemplary embodiment of the two dimensional configuration engine of FIGS. 1A-1B along section 3A-3A.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "forward" and "aft" refer to relative positions within a heat engine or vehicle, and refer to the normal operational attitude of the heat engine or vehicle. For example, with regard to a heat engine, forward refers to a position closer to a heat engine inlet and aft refers to a position closer to a heat engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

Embodiments of an engine and combustion section are generally provided that improve combustion stability and performance for ramjet and scramjet engines, and gas turbine engines including inter-turbine burners or afterburning exhaust systems, or duct burners generally. Various embodiments of the engine generally provided herein define a rotating detonation combustion region upstream of a main combustion process, such as a conventional or deflagrative combustion process. In various embodiments, the rotating detonation combustion region may generally act as a pilot burner for the downstream conventional combustion process, such as to improve stability and performance of the combustion section of the engine. Furthermore, embodiments of the engine generally provided may effectuate a cross sectional area change of a gas flowpath via modulation of a fuel split between the rotating detonation combustion region and the conventional combustion process, thereby enabling operation of the combustion section over a range or plurality of dynamic pressures in the gas flowpath in contrast to an approximately constant q-path.

Referring now to the drawings, FIGS. 1A-1B and FIGS. 2A-2B are lengthwise cross sectional views of an exemplary Brayton cycle engine (hereinafter, "engine 10"). Various embodiments of the engine 10 may define a ramjet, a scramjet, inter-turbine burner or afterburner/augmentor for a gas turbine engine, or duct burner generally. As such, though the engine 10 generally provided herein may substantially define a supersonic combustion ramjet or scramjet engine (e.g., FIG. 1A, FIG. 2A) or a subsonic combustion ramjet engine (e.g., FIG. 1B, FIG. 2B), various embodiments may define a portion of an engine, such as a gas turbine engine, such as to provide inter-turbine thrust, afterburning thrust, or a multiple-cycle machine (e.g., a ramjet or scramjet integrated with a gas turbine engine).

Referring to FIGS. 1A-1B and FIGS. 2A-2B, the engine 10 defines an inlet section 20, a combustion section 100, and an exhaust section 30 in serial flow arrangement along a lengthwise direction L. The engine 10 includes a longitudinal wall 110 extended along the lengthwise direction L. The longitudinal wall 110 defines, at least in part, a gas flowpath 90 of the engine 10. For example, the longitudinal wall 110 is extended along the lengthwise direction L and contoured to define the combustion section 100 of the engine 10. The longitudinal wall 110 may further be extended along the lengthwise direction L and contoured to define the inlet section 20 of the engine 10.

For example, referring to FIGS. 1A-1B and FIGS. 2A-2B, the inlet section 20 is generally contoured to admit a flow of oxidizer, shown schematically by arrows 81, into the engine 10 to flow through the gas flowpath 90 to the combustion section 100. In FIG. 1A and FIG. 2A, the engine 10 generally defines a scramjet engine, such as to admit a supersonic flow of oxidizer 81 into the gas flowpath 90 of the engine 10 and maintain an axial velocity greater than Mach 1 at the combustion section 100. In FIG. 1B and FIG. 2B, the engine 10 generally defines a ramjet engine, such as to admit a flow of oxidizer 81 into the engine 10, including a supersonic flow. However, the longitudinal wall 110 defines contours such as to retard the flow of oxidizer 81 upstream of the combustion section 100 to a subsonic axial velocity (i.e., less than Mach 1), such as generally depicted at contour 21.

Referring still to FIG. 1B, the longitudinal wall 110 of the engine 10 generally depicted further defines contours such as to define a nozzle 31 at the exhaust section 30. The nozzle 31 accelerates a flow of combustion gases through the gas flowpath 90, shown schematically by arrows 82, from the combustion section 100 to generate thrust. The nozzle 31 may define a convergent nozzle or a convergent-divergent nozzle based at least on a desired range of operating air speed of the engine 10.

In the embodiments generally provided in FIGS. 1A-1B, the engine 10 defines a two-dimensional configuration, such as further detailed in regard to FIG. 3A depicting an exemplary cross sectional embodiment at section 3A-3A of FIGS. 1A-1B. As generally depicted in FIG. 3A, the exemplary two-dimensional configuration of the engine 10 defines a width W and a height H. In the embodiments generally provided in regard to FIGS. 1A-1B and FIG. 3A, the longitudinal wall 110 may further extend along the width W and the height H, such as to define a substantially rectangular cross section of the gas flowpath 90. As another example, width W and height H may be approximately equal such as to define a substantially square cross sectional area.

In other embodiments, such as generally provided in FIGS. 2A-2B, the engine 10 defines a generally axisymmetric configuration relative to a reference axial centerline 12 extended along the lengthwise direction L. Further cross sectional embodiments at section 3B-3B (FIG. 2A) and section 3C-3C (FIG. 2B) are generally depicted and described in regard to FIGS. 3B-3C. In various embodiments, such as generally provided in regard to FIGS. 2A-2B and FIGS. 3B-3C, the longitudinal wall 110 may extend annularly around the axial centerline 12, such as to define a substantially circular or annular cross section of the gas flowpath 90.

Figure 3B:
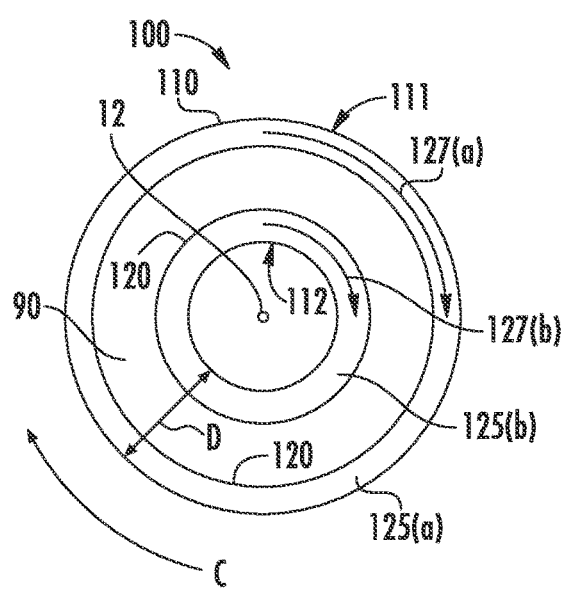
FIG. 3B is a cross sectional view of an exemplary embodiment of the axisymmetric configuration engine of FIG. 2A along section 3B-3B.
Figure 3C:
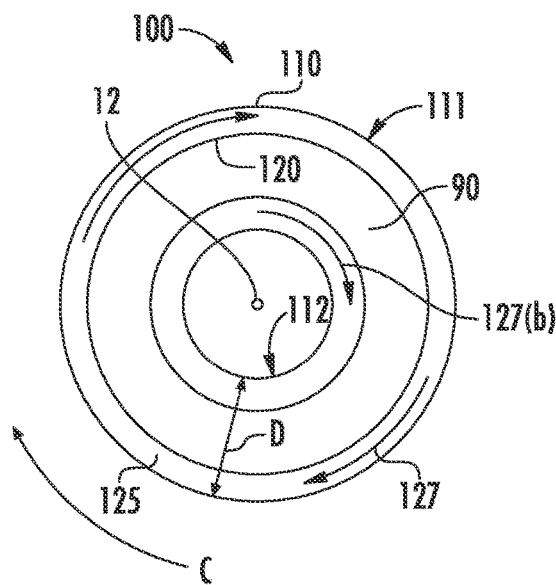
FIG. 3C is a cross sectional view of an exemplary embodiment of the axisymmetric configuration engine of FIG. 2B along section 3C-3C.
Figure 4:
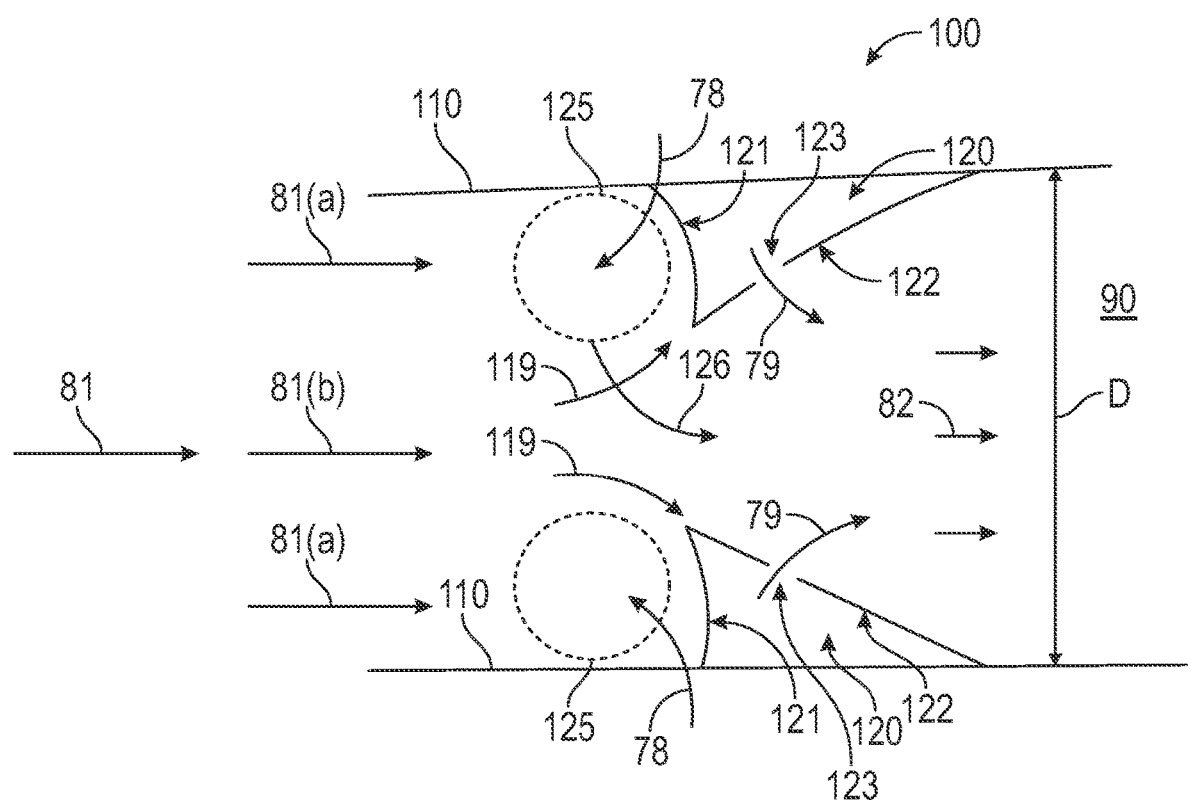
FIG. 4 is a detailed lengthwise cross sectional view of an exemplary embodiment of a combustion section of the engines generally provided in FIGS. 1A-1B and FIGS. 2A-2B according to an aspect of the present disclosure.

Referring now to FIGS. 1A-1B, FIGS. 2A-2B and FIGS. 3A-3C, and further in conjunction with the exemplary detailed views provided in FIG. 4, the engine 10 further includes an inner wall assembly 120 extended into the gas flowpath 90. The inner wall assembly 120 partially blocks or captures a portion of the flow of oxidizer 81 at an upstream face 121 of the inner wall assembly 120, such as shown schematically by arrows 81(a). The inner wall assembly 120 defines a region, shown schematically at circle 125, upstream of the inner wall assembly 120. More particularly, a region 125, such as defining a sheltered cavity, is defined adjacent to the upstream face 121 and the longitudinal wall 110. A first flow of fuel, shown schematically by arrows 78, is mixed with the captured portion of oxidizer 81(a) at the region 125 (shown and described further in regard to FIGS. 5A-5B). This fuel-oxidizer mixture is then ignited with a high-energy source to setup a detonation wave, such as shown schematically by arrows 127 in FIGS. 3A-3C.

Referring still to FIG. 4, in conjunction with FIGS. 1A-1B, FIGS. 2A-2B, and FIGS. 3A-3C, a portion of the detonation gases from the detonation wave 127 (FIGS. 3A-3C), shown schematically by arrows 126, exits the region 125 and mixes with the flow of oxidizer 81(b) not captured in the region 125 by the inner wall assembly 120. As the detonation gases 126 and oxidizer 81(b) flow downstream of the upstream face 121 of the inner wall assembly 120, a second flow of fuel, shown schematically by arrows 79, is provided through a downstream wall 122 of the inner wall assembly 120 into the gas flowpath 90. The detonation gases 126, oxidizer 81(b), and fuel 79 are mixed and burned to produce combustion gases 82 that further provide thrust as previously described herein. In various embodiments, the mixture of detonation gases 126, oxidizer 81(b), and fuel 79 may be mixed and burned as a deflagrative combustion process or a detonative combustion process.

The inner wall assembly 120 such as described herein may improve stabilization of the downstream combustion process including the oxidizer 81(b) and the second flow of fuel 79 by controlling the production of detonation gases 126 via controlling a flow rate of the first flow of fuel 78 provided to the detonation process within the region 125. For example, the first flow of fuel 78 and the portion of oxidizer 81(a) may together alter a fuel/oxidizer mixture downstream of the inner wall assembly 120. As another example, the inner wall assembly 120 capturing the portion of oxidizer 81(a) and providing the first flow of fuel 78 may define a pilot burner control for the combustion section 100 such as to improve overall combustion stability, performance, or operability at various flow rates, pressures, or temperatures of the flow of oxidizer 81. As still another example, the inner wall assembly 120 generally enables an independent aerodynamic method to provide an area change along the gas flowpath 90 via changes in the first flow of fuel 78, as well as changes in the first flow of fuel 78 relative to the second flow of fuel 79. As such, the inner wall assembly 120 enables operation of the engine 10 over a plurality of dynamic pressures of the flow of oxidizer 81 rather than being restricted to an approximately constant volumetric flow rate through the gas flowpath 90.

Referring back to FIG. 4, the inner wall assembly 120 may further define a tip 119 extended into the gas flowpath 90. In various embodiments, the tip 119 is extended at least partially toward an upstream end of the engine 10 (i.e., toward the inlet section 20). The tip 119 may be defined at an inward-most end of the upstream face 121 of the inner wall assembly 120 into the gas flowpath 90. For example, the tip 119 may generally be defined approximately where the upstream face 121 and the downstream face 122 are coupled. In various embodiments, the tip 119 defines a waveform extended along the width W and/or height H, i.e., along the cross section at the length along the lengthwise direction L relative to two-dimensional embodiments such as generally provided in FIG. 3A. As other embodiments, the tip 119 defines a waveform extended along the annulus or circumferential direction C relative to axisymmetric embodiments such as generally provided in FIGS. 3B-3C. In still various embodiments, the tip 119 defines a sine wave, a triangle wave, a box wave, a saw tooth wave, or combinations thereof.

Referring back to the generally axisymmetric configurations of the engine 10 generally provided in regard to FIGS. 2A-2B and FIGS. 3B-3C, the longitudinal wall 110 may further define a first longitudinal wall 111 defined radially outward of a second longitudinal wall 112. Each of the first longitudinal wall 111 and the second longitudinal wall 112 are configured substantially as shown and described in regard to the longitudinal wall 110. For example, in one embodiment of the engine 10 and longitudinal wall 110 such as generally shown in FIG. 2A and FIG. 3B, the inner wall assembly 120 may extend into the gas flowpath 90 from one or more of the first longitudinal wall 111 or the second longitudinal wall 112.

The inner wall assembly 120 extended from the first longitudinal wall 111 may define a first rotating detonation combustion region 125(a). The inner wall assembly 120 extended from the second longitudinal wall 112 may define a second rotating detonation combustion region 125(b). As generally depicted in FIG. 2A and FIG. 3B, the first region 125(a) is defined generally along an outer radius proximate to the first longitudinal wall 111. The second region 125(b) is defined generally along an inner radius proximate to the second longitudinal wall 112. Referring to FIG. 3B, a first detonation wave 127(a) may propagate through the first region 125(a) and a second detonation wave 127(b) may propagate through the second region 125(b).

In one embodiment, the first detonation wave 127(a) and the second detonation wave 127(b) propagate co-rotationally, i.e., the first detonation wave 127(a) and the second detonation wave 127(b) propagate along the same circumferential direction C around the axial centerline 12. In another embodiment, the first detonation wave 127(a) and the second detonation wave 127(b) propagate counter-rotationally, i.e., the first detonation wave 127(a) and the second detonation wave 127(b) propagate along the circumferential direction C around the axial centerline 12 opposite of one another. In various embodiments, the detonation wave 127 may propagate clockwise or counter-clockwise through the gas flowpath 90.

It should be appreciated that descriptions and depictions of detonation wave 127 herein and throughout generally apply to the first detonation wave 127(a) and the second detonation wave 127(b), unless otherwise specified. Still further, it should be appreciated that descriptions and depictions of longitudinal wall 110 herein and throughout generally apply to the first longitudinal wall 111 and the second longitudinal wall 112, unless otherwise specified. Furthermore, it should be appreciated that descriptions and depictions of the region 125 herein and throughout generally apply to the first region 125(a) and the second region 125(b), unless otherwise specified.

Figure 5A:
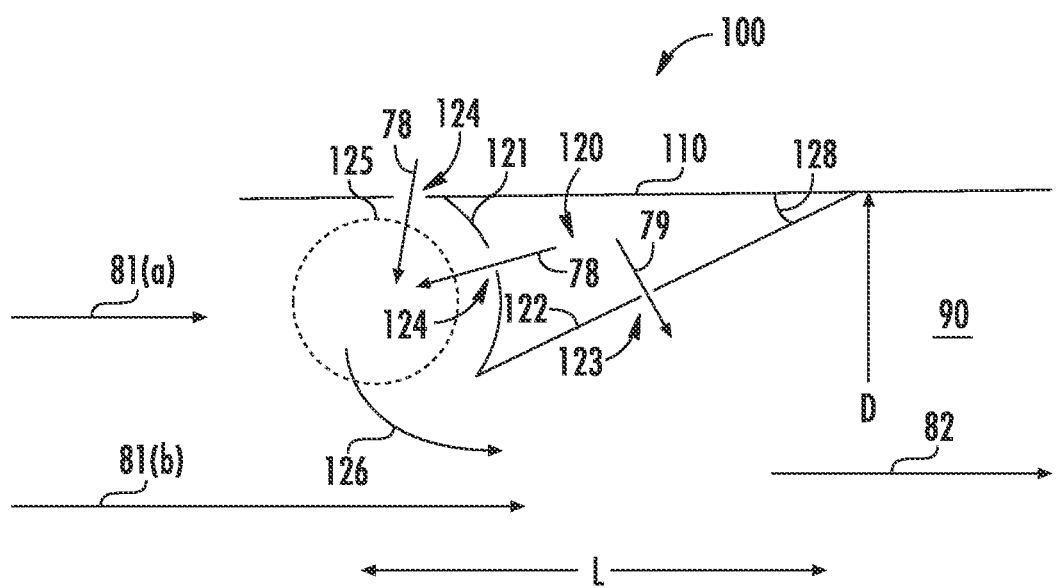
FIGS. 5A-5B are detailed lengthwise cross sectional views of exemplary embodiments of a combustion section of the engines generally provided in FIGS. 1A-1B and FIGS. 2A-2B according to an aspect of the present disclosure.
Figure 5B:
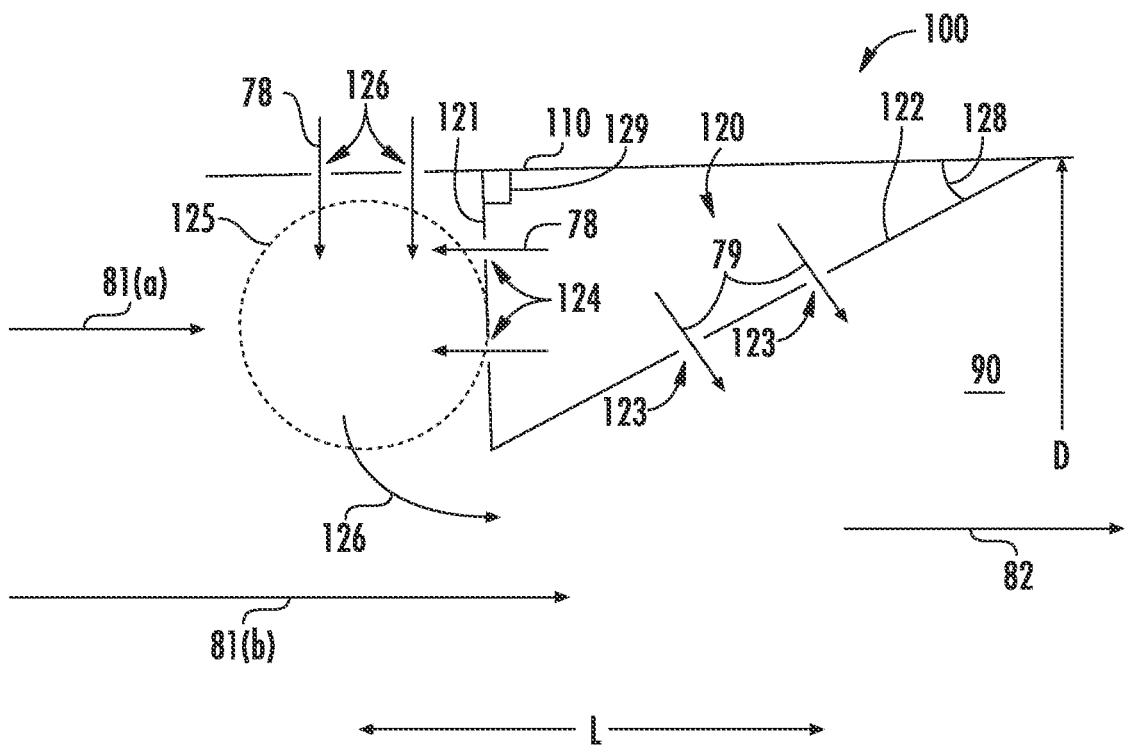

Referring now to FIGS. 5A-5B, further exemplary embodiments of a portion of the combustion section 100 of the engine 10 generally depicted in FIGS. 1A-1B, 2A-2B, 3A-3C, and 4A-4B, are generally provided. The embodiments depicted in FIGS. 5A-5B further detail embodiments of a first fuel injection port 124 providing the first flow of fuel 78 and a second fuel injection port 123 providing the second flow of fuel 79 such as previously described herein. In various embodiments, the second fuel injection port 123 is defined through the downstream wall 122 of the inner wall assembly 120 to provide the second flow of fuel 79. For example, the second fuel injection port 123 provides the second flow of fuel 79 generally at or downstream of the inner wall assembly 120. The second fuel injection port 123 may generally provide the second flow of fuel 79 to mix with the flow of oxidizer 81(b) for a conventional or deflagrative combustion process. In various embodiments, the conventional combustion process downstream of the detonative combustion region 125 may define a main burner or combustion process, such as to enable high power or maximum power operation of the engine 10. In still various embodiments, the first fuel injection port 124 is independently controllable from the second fuel injection port 123, such as to provide a pressure, flow, or temperature of the first flow of fuel 78 different from the second flow of fuel 79.

In one embodiment of the engine 10, the first fuel injection port 124 is defined through the longitudinal wall 110. For example, the first fuel injection port 124 may be defined through the longitudinal wall 110 upstream of the inner wall assembly 120 such as to provide the first flow of fuel 78 approximately perpendicular to the flow of oxidizer 81 through the gas flowpath 90 into the region 125. As another example, the first fuel injection port is defined generally adjacent to the region 125, such as upstream and adjacent to the upstream face 121 of the inner wall assembly 120.

In another embodiment of the engine 10, the first fuel injection port 124 is defined through the upstream face 121 of the inner wall assembly 120. For example, the first fuel injection port 124 may be defined through the upstream face 121 such as to provide the first flow of fuel 78 into the region 125 approximately parallel to the flow of oxidizer 81 through the gas flowpath 90. In various embodiments, the upstream face 121 is disposed at an angle relative to the direction of flow of oxidizer 81 through the gas flowpath 90. As such, the first fuel injection port 124 may further be defined at an acute angle relative to the direction of flow of oxidizer 81 through the gas flowpath 90, such as generally corresponding to the acute angle of the upstream face 121.

Referring to the exemplary embodiment providing in FIG. 5A, the upstream face 121 is extended into the gas flowpath 90, such as along the depth D. In one embodiment, the upstream face 121 is defined substantially concave. For example, the upstream face 121 protrudes toward the downstream face 122. The concaved upstream face 121 may define a pocket or sheltered cavity promoting the region 125 at which the detonation wave 127 (FIGS. 3A-3C) propagates. Referring to FIGS. 5A-5B, a point or portion at which the upstream face 121 and the downstream face 122 are coupled may be approximately equal to (e.g., FIG. 5B) or forward (e.g., FIG. 5A) along the lengthwise direction L of a point or portion at which the upstream face 121 and the longitudinal wall 110 are coupled. As such, the upstream face 121 of the inner wall assembly 120 may enable capturing the portion of flow of oxidizer 81(a) to generate the detonation wave 127 (FIGS. 3A-3C) within the region 125.

Referring to the exemplary embodiment generally provided in FIG. 5B, the upstream face 121 may extend substantially inward into the gas flowpath 90. For example, the upstream face 121 may extend approximately perpendicular from the longitudinal wall 110 into the gas flowpath 90. In other embodiments, such as where the longitudinal wall 110 is oblique (i.e., not parallel) to the reference lengthwise direction L, the upstream face 121 may extend approximately perpendicular into the gas flowpath 90 relative to the reference lengthwise direction L. As such, an angle 129 between the longitudinal wall 110 and the upstream face 121 may be between approximately 45 degrees and approximately 135 degrees. In various embodiments, the angle 129 may be approximately 90 degrees.

Referring now to the embodiments generally provided in FIG. 4 and FIGS. 5A-5B, the upstream face 121 may extended from the longitudinal wall 110 along a reference depth D into the gas flowpath 90. In various embodiments, such as defining a two dimensional gas flowpath 90 of the engine 10 generally provided in FIGS. 1A-1B, the reference depth D is based on the height H or the width W (FIGS. 3A-3C) of the gas flowpath 90. The upstream face 121 of the inner wall assembly 120 is extended into the gas flowpath 90 at reference depth D based on a minimum number of cells required to sustain rotating detonation at the region 125. The detonation cell is characterized by a cell width (X) that depends on the type of fuel (e.g., liquid or gas hydrogen or hydrocarbon fuel, or combinations thereof) and oxidizer (e.g., air or oxygen) as well as the pressure and temperature of the reactants (i.e., fuel 78 and oxidizer 81(a)) at the region 125 and the stoichiometry (4)) of the reactants. For each combination of fuel 78 and oxidizer 81(a), cell size decreases with increasing pressure and temperature, and for stoichiometry greater than or less than 1.0. As the cell width may decrease by 20 times or more from a lowest steady state operating condition to a highest steady state operating condition, the flow rate of fuel 78 is modulated based at least on a pressure, flow, or temperature of the oxidizer 81(a) entering the region 125 such as to provide a sustainable detonation cell size across the plurality of operating conditions of the engine 10.

Still further, the first flow of fuel 78 may be modulated based on a desired location into which the fuel 78 enters the region 125. For example, in one embodiment, the first fuel injection port 124 may be defined through the upstream face 121 and the longitudinal wall 110. As such, fuel 78 may be modulated through the upstream face 121 and the longitudinal wall 110 such as to define different fuel splits or flow rates through each of the upstream face 121 or longitudinal wall 110.

Referring still to FIGS. 5A-5B, in one embodiment, the upstream face 121 is extended from the longitudinal wall 110 into approximately 35% or less of the gas flowpath 90 along the reference depth D. Alternatively, the upstream face 121 is extended from the longitudinal wall 110 into the gas flowpath 90 equal to or less than approximately 35% of depth D. Still further, the upstream face 121 is extended from the longitudinal wall 110 into the gas flowpath 90 equal to or less than approximately 35% of depth D relative to approximately a portion of the gas flowpath 90 along the lengthwise direction L from which the upstream face 121 is extended from the longitudinal wall 110.

In regard to two-dimensional embodiments of the engine 10, such as generally provided in FIGS. 1A-1B and FIG. 3A, the reference depth D may be based on the height H (FIG. 3A). In other two-dimensional embodiments of the engine 10, the reference depth D may be based on the width W (FIG. 3A). In regard to generally axisymmetric embodiments of the engine 10, such as generally provided in FIGS. 2A-2B and FIGS. 3B-3C, the reference depth D may be a radial distance from an inner radius (e.g., at an inner second longitudinal wall 112) to an outer radius (e.g., at an outer first longitudinal wall 111).

In various embodiments, the upstream face 121 is extended from the longitudinal wall 110 into the gas flowpath 90 equal to or less than approximately 20% of depth D. In still yet various embodiments, the upstream face 121 is extended from the longitudinal wall 110 into the gas flowpath 90 equal to or less than approximately 13% of depth D. In still another embodiment, the upstream face 121 is extended from the longitudinal wall 110 into the gas flowpath 90 equal to or less than approximately 7% of depth D.

Referring still to the exemplary embodiments generally provided in FIGS. 5A-5B, the downstream face 122 of the inner wall assembly 120 may extend at an acute angle 128 from the longitudinal wall 110 toward the upstream face 121. In various embodiments, the angle 128 is between approximately 10 degrees and approximately 80 degrees. In still various embodiments, the angle 128 is between approximately 30 degrees and approximately 60 degrees. It should be appreciated that in other embodiments (not shown), the downstream face 122 may further define a convex or concave wall protruding into the gas flowpath 90 or toward the upstream face 121.

Figure 6A:
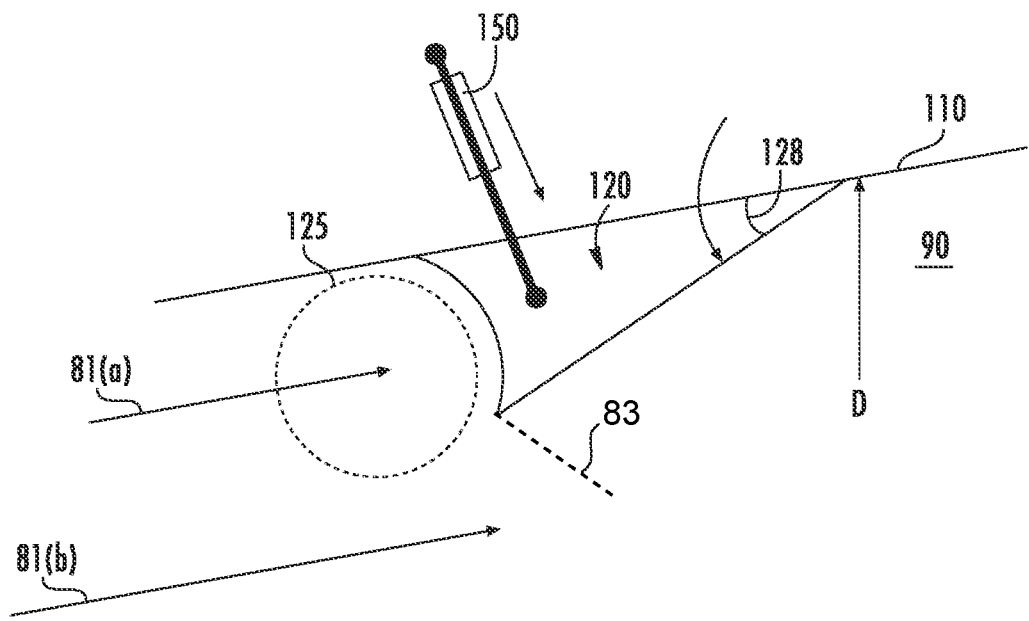
FIG. 6A is a lengthwise cross sectional view of an exemplary embodiment of a portion of the combustion section generally provided in FIG. 4 and FIGS. 5A-5B in a fully extended position.
Figure 6B:
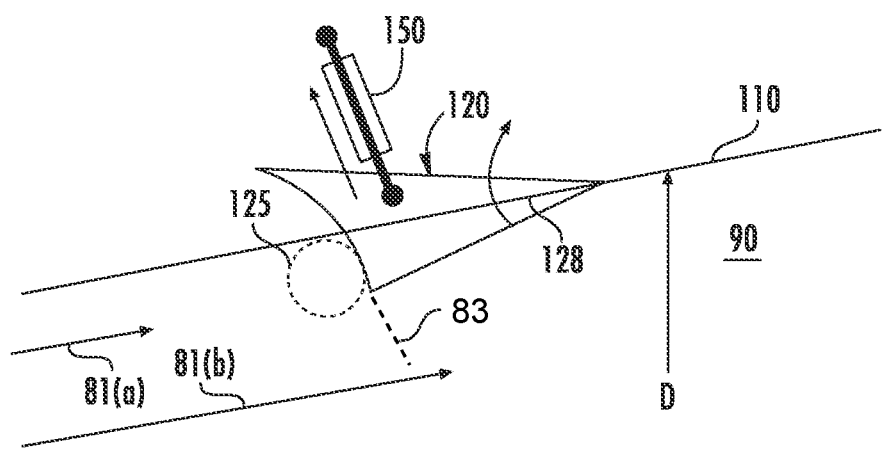
FIG. 6B is a lengthwise cross sectional view of an exemplary embodiment of a portion of the combustion section generally provided in FIG. 6A in a partially extended position.

Referring now to FIGS. 6A-6B, further exemplary embodiments of the combustion section 100 of the engine 10 are generally provided. The exemplary embodiments depicted in FIGS. 6A-6B are configured substantially similarly as shown and described in regard to FIGS. 1A-1B, FIGS. 2A-2B, FIGS. 3A-3C, FIG. 4, and FIGS. 5A-5B (as such, features and reference numerals shown on the aforementioned figures may not necessarily be transposed to FIGS. 6A-6B). The embodiments depicted in FIGS. 6A-6B generally depict the inner wall assembly 120 as providing an adjustable depth D through the gas flowpath 90. For example, FIG. 6A depicts the inner wall assembly 120 as fully extended into the gas flowpath 90. As another example, FIG. 6B depicts the inner wall assembly 120 as partially extended into the gas flowpath 90. As previously described, the inner wall assembly 120 is extended into the gas flowpath 90 at depth D based on a minimum number of detonation cells required to sustain rotating detonation at the region 125.

In various embodiments, the engine 10 further includes an actuator 150 coupled to the inner wall assembly 120 to adjust the depth D of the inner wall assembly 120 in the gas flowpath 90. The actuator 150 may extend the inner wall assembly 120, or more specifically, the upstream face 121, to approximately 35% of the depth D of the gas flowpath 90 from the longitudinal wall 110. The actuator 150 may further contract the inner wall assembly 120, or more specifically, the upstream face 121, to approximately 0% of the depth D of the gas flowpath 90. As such, the actuator 150 may contract the inner wall assembly 120 to be approximately flush to the longitudinal wall 110.

Furthermore, actuation or articulation of the inner wall assembly 120 may further be based on a desired angle 128 of the inner wall assembly 120, or more specifically, the downstream face 122, into the gas flowpath 90. Adjusting the angle 128 may further adjust an angle at which the second fuel injection port 123 (FIGS. 5A-5B) is disposed into the gas flowpath 90 relative to the flow of oxidizer 81(b).

In one embodiment, the inner wall assembly 120 may adjust its depth D into the gas flowpath 90 via pivoting at the point or portion at which the downstream face 122 is coupled to the longitudinal wall 110. For example, the angle 128 at which the downstream face 122 is extended from the longitudinal wall 110 may be adjusted to increase or decrease the depth D at which the upstream face 121 is extended into the gas flowpath 90. In another embodiment, and further in regard to axisymmetric embodiments of the engine 10 generally provided in regard to FIGS. 2A-2B, the inner wall assembly 120 may adjust its depth D into the gas flowpath 90 via actuating or articulating at least partially along the tangential or circumferential direction C relative to the axial centerline 12 or gas flowpath 90 annulus. Still further, the actuator 150 coupled to the inner wall assembly 120 may dispose the inner wall assembly 120 at least partially along the tangential or circumferential direction C.

In still various embodiments, such as further in regard to supersonic combustion or scramjet embodiments generally described and depicted in regard to FIG. 1A and FIG. 2A, the inner wall assembly 120 defining the detonation wave region 125 may further affect the oblique shock structure of an oblique shock wave 83 produced from the supersonic flow of oxidizer 81 through the gas flowpath 90. For example, modulation of the first flow of fuel 78 to the region 125 will affect the oblique shock structure of the oblique shock wave 83 across a plurality of operating conditions of the engine 10. Still further, the actuating or articulating inner wall assembly 120 will also affect the oblique shock structure of the oblique shock wave 83 across the plurality of operating conditions of the engine 10. As such, affecting the oblique shock wave 83 may be used to improve combustion stability and performance of the engine 10.

Figure 7A:
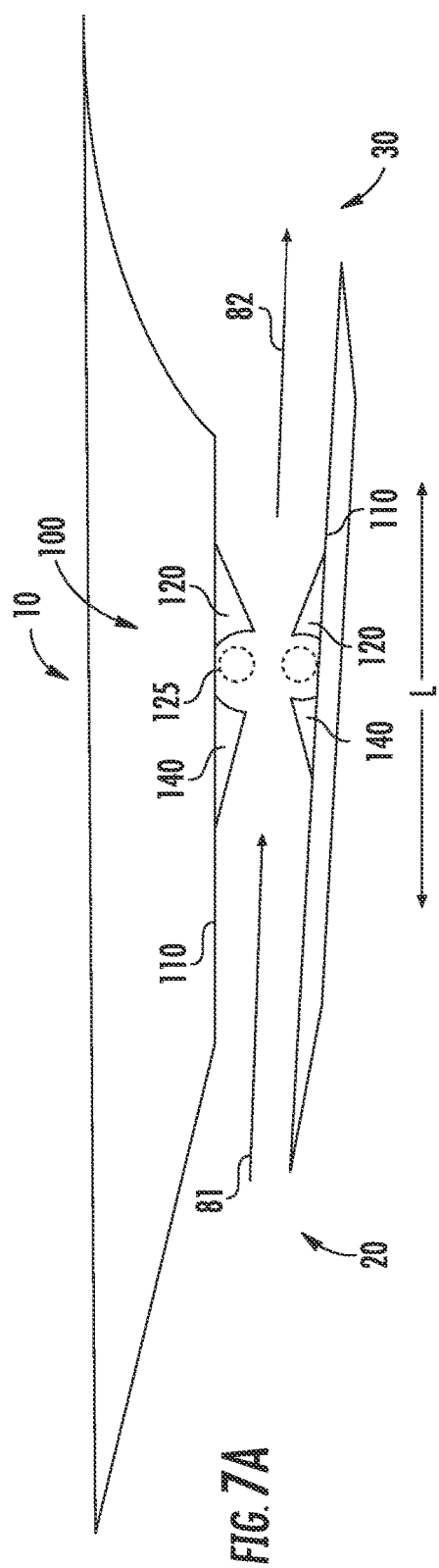
FIG. 7A is a lengthwise cross sectional view of an exemplary embodiment of a two dimensional configuration engine according to an aspect of the present disclosure.
Figure 7B:
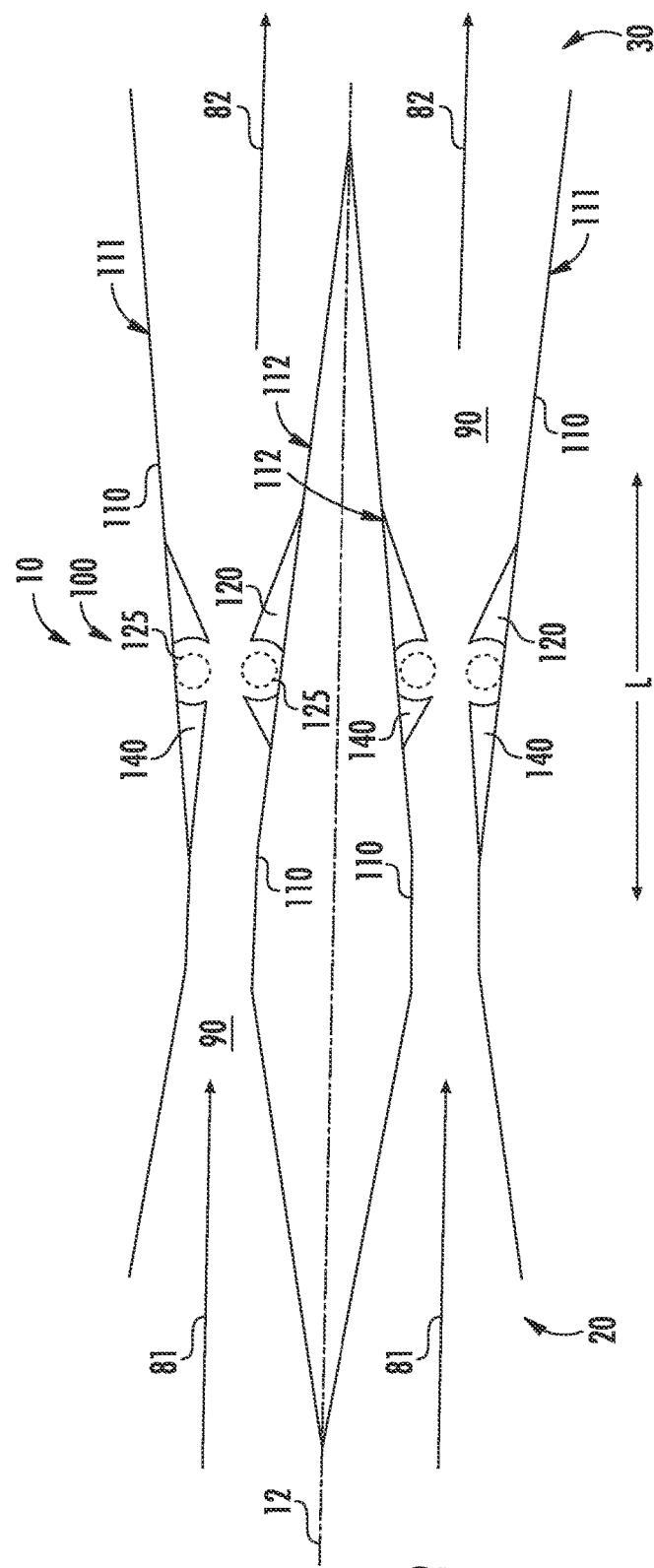
FIG. 7B is a lengthwise cross sectional view of an exemplary embodiment of a axisymmetric configuration engine according to an aspect of the present disclosure.

Referring now to FIGS. 7A-7B, further exemplary embodiments of the engine 10 are generally provided. The exemplary embodiments generally provided in regard to FIGS. 7A-7B are configured substantially similarly as shown and described in regard to FIGS. 1A-1B, FIGS. 2A-2B, FIGS. 3A-3C, FIG. 4, FIGS. 5A-5B, and FIGS. 6A-6B. More specifically, FIGS. 7A-7B generally depict supersonic combustion configurations of the engine 10, in which the flow of oxidizer 81 enters the combustion section 100 at a speed at or above Mach 1. Still more specifically, FIG. 7A depicts a generally two-dimensional configuration of the engine 10, such as shown and described in regard to FIGS. 1A-1B and FIG. 3A. Furthermore, FIG. 7B depicts a generally axisymmetric configuration of the engine 10, such as shown and described in regard to FIGS. 2A-2B and FIGS. 3B-3C.

Figure 8A:
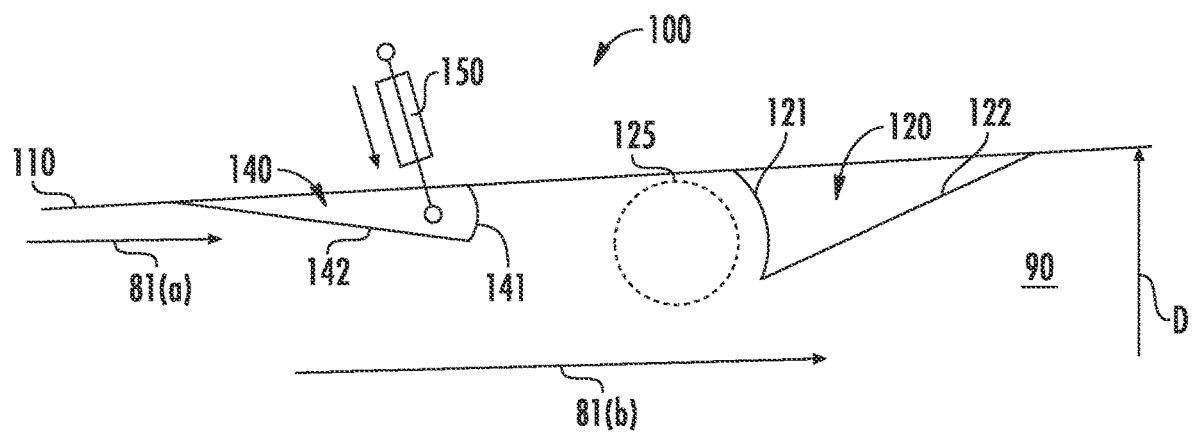
FIG. 8A is a lengthwise cross sectional view of an exemplary embodiment of a portion of the combustion section generally provided in FIG. 4, FIGS. 5A-5B, and FIGS. 7A-7B in a fully extended position.
Figure 8B:
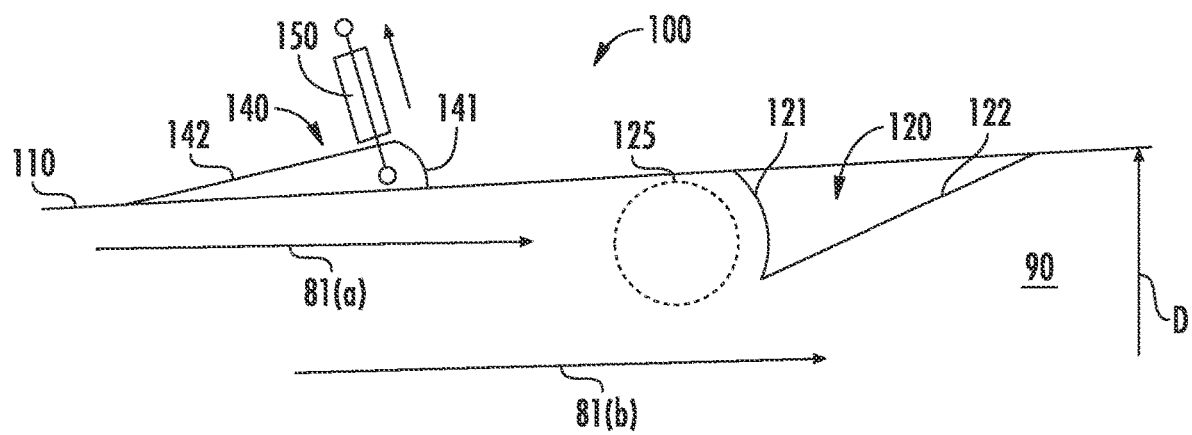
FIG. 8B is a lengthwise cross sectional view of an exemplary embodiment of a portion of the combustion section generally provided in FIG. 8A in a fully retracted position.

The embodiments of the engine 10 depicted in FIGS. 7A-7B, and further depicted in FIGS. 8A-8B, further include an upstream wall assembly 140 disposed upstream along the lengthwise direction L of the inner wall assembly 120 and the region 125. The upstream wall assembly 140 is coupled to the longitudinal wall 110 and extended into the gas flowpath 90. The upstream wall assembly 140 may further include a first face 141 extended from the longitudinal wall 110 into the gas flowpath 90 and a second face 142 extended from the longitudinal wall 110 and coupled to the first face 141.

Referring now to FIGS. 8A-8B, the upstream wall assembly 140 may actuate or articulate into and out of the gas flowpath 90 such as to adjust the depth D of the first face 141. For example, FIG. 8A depicts the upstream wall assembly 140 fully extended into the gas flowpath 90. FIG. 8B depicts the upstream wall assembly 140 fully extended out of the gas flowpath 90. The upstream wall assembly 140 may alter an amount of the flow of oxidizer 81 that enters the region 125 (i.e., the amount or magnitude of the portion of oxidizer 81(a)) to generate the detonation wave 127 (FIGS. 3A-3C). Altering the flow of oxidizer 81(a) to the region 125 may be based on the operating condition of the engine 10. For example, the upstream wall assembly 140 may extended or contract from the longitudinal wall 110 to control an intensity or magnitude of the detonation wave 127, or the portion of detonation gases 126 mixed with the flow of oxidizer 81(b) and fuel 79 to produce combustion gases 82.

Figure 9:
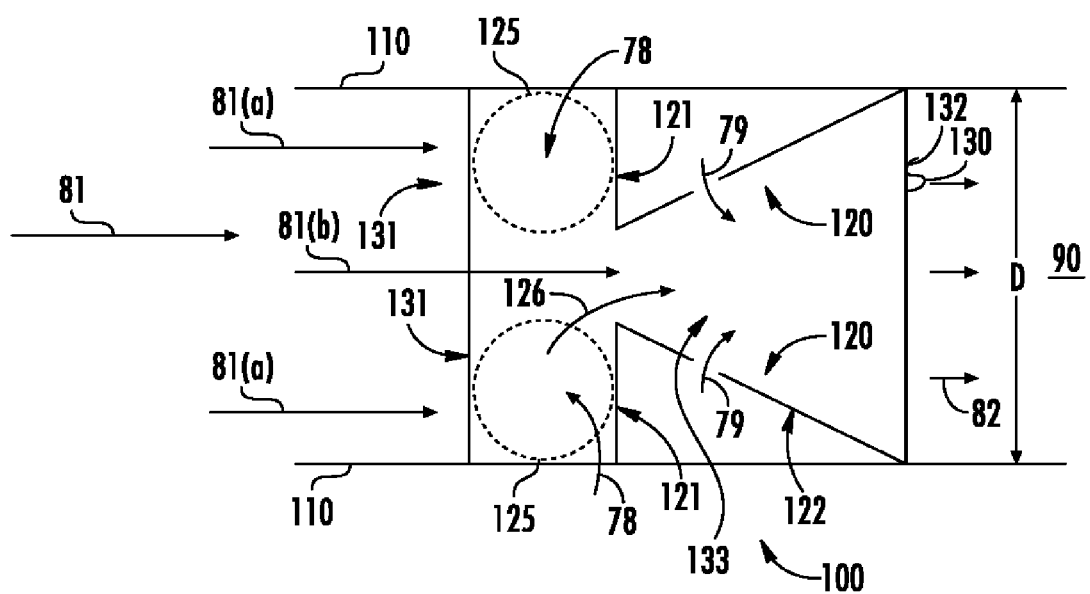
FIG. 9 is a detailed lengthwise cross sectional view of another exemplary embodiment of a combustion section of the engines generally provided in FIGS. 1A-1B, FIGS. 2A-2B, and FIGS. 7A-7B according to an aspect of the present disclosure.
Figure 10A:
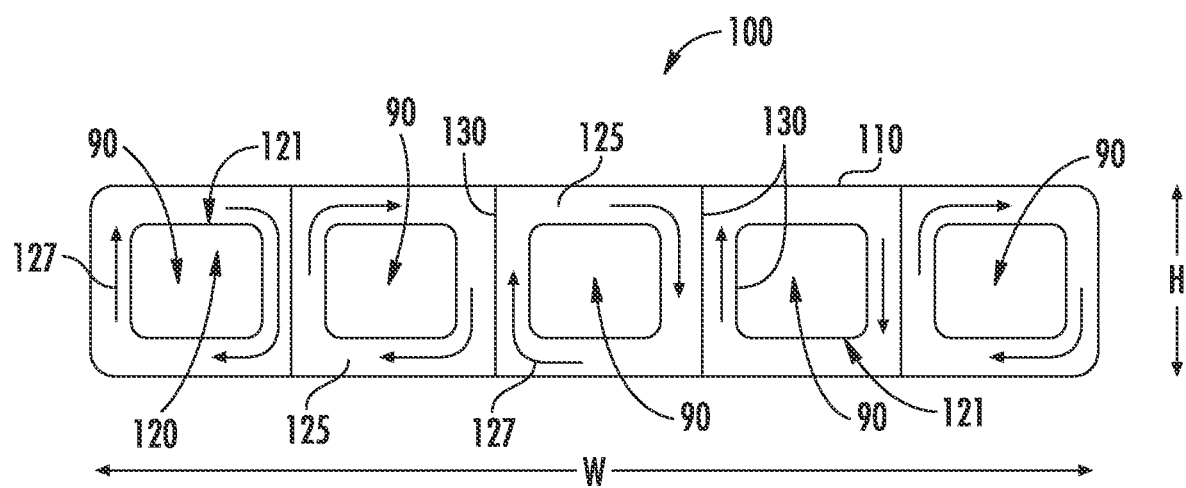
FIG. 10A is a cross sectional view of the detailed view generally provided in FIG. 9 as an exemplary two dimensional configuration.
Figure 10B:
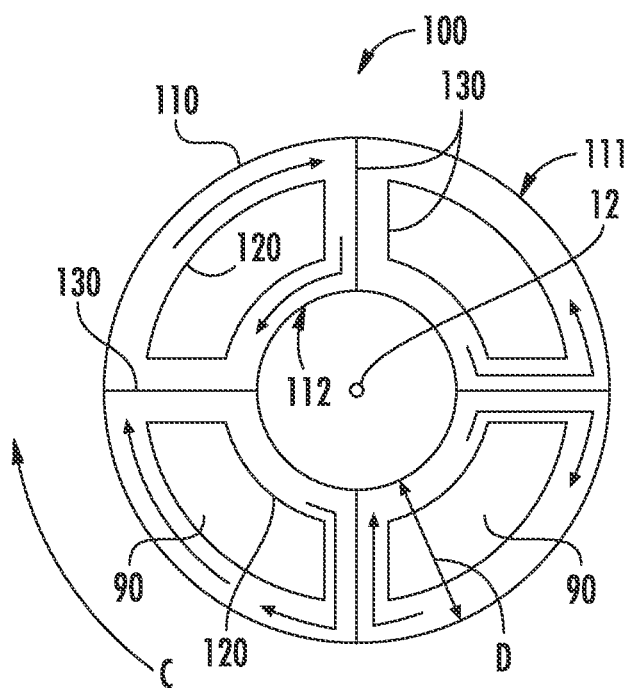
FIG. 10B is a cross sectional view of the detailed view generally provided in FIG. 9 as an exemplary axisymmetric configuration.
Figure 11:
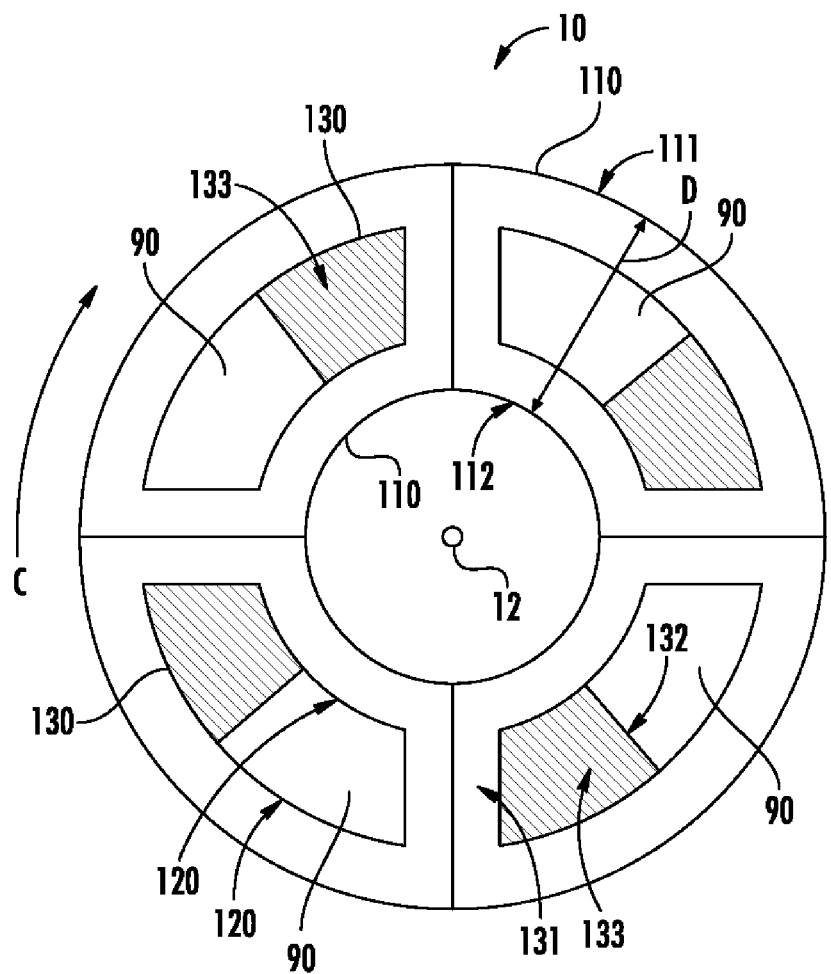
FIG. 11 is another exemplary axisymmetric cross sectional view of the engine according to an aspect of the present disclosure.

Referring now to FIG. 9, a lengthwise cross sectional view of an embodiment of the combustion section 100 is generally provided. Referring further to FIGS. 10A-10B and FIG. 11, additional cross sectional views of embodiments of the combustion section 100 are generally provided. The embodiments generally provided in FIG. 9, FIGS. 10A-10B, and FIG. 11 are configured substantially similarly as shown and described in regard to FIG. 4 and FIGS. 3A-3B, respectively. However, in FIG. 9 and FIGS. 10A-10B, the combustion section 100 further includes a strut 130 extended between the longitudinal walls 110 into the gas flowpath 90. Still further, the inner wall assembly 120 is extended from the strut 130 into the gas flowpath 90. In various embodiments, such as depicted in FIGS. 10A-10B and FIG. 11, the inner wall assembly 120 is coupled to the longitudinal wall 110 and the strut 130 such as to define a plurality of the region 125 bounded by the longitudinal wall 110 and the strut 130.

For example, in one embodiment, the strut 130 is extended along the height H (FIG. 10A) across the gas flowpath 90 and is coupled to the longitudinal wall 110 opposite along the height H (FIG. 10A). As another example, in the embodiment generally provided in FIG. 10B, the strut 130 is extended between an outer radius of the longitudinal wall 110 and an inner radius of the longitudinal wall 110 along the depth D across the gas flowpath 90. More specifically, the strut 130 may extend between the first longitudinal wall 111 at an outer radius and the second longitudinal wall 112 at an inner radius.

Each strut 130 generally defines a plurality of the region 125 and detonation wave 127 generally fluidly segregated from one another. For example, the combustion section 100 defines a quantity of generally fluidly segregated regions 125 equal to one greater than the quantity of struts 130. Stated alternatively, quantity n struts 130 generates quantity n+1 regions 125. Each of the plurality of regions defines a detonation wave 127 therethrough generally fluidly segregated from one another adjacent regions 125.

Referring still to FIG. 9, FIGS. 10A-10B, and FIG. 11, the struts 130 enable generating and controlling a plurality of detonation zone regions 125 at the combustion section 100. Each region 125 defines a separate detonation wave 127 within it. Furthermore, each region 125 provides a portion of detonation gases 126 out of the region 125 to mix with the oxidizer 81(b) and fuel 79. In various embodiments, each region 125 may include a separately controllable flow of fuel 78 from two or more of the first fuel injection port 124 (FIG. 5A-5B). As such, the struts 130 may enable defining a plurality of distinct detonation zone regions 125 such as to adjust a temperature profile downstream of the region 125 within the gas flowpath 90. For example, the plurality of regions 125 may adjust a temperature profile across the height H and/or width W or generally across the depth D such as to reduce a temperature gradient across the gas flowpath 90, the longitudinal wall 110, or both. Reducing the temperature gradient may improve durability of the engine 10, reduce deterioration or wear of the engine 10, and generally improve reliability.

In various embodiments, the strut 130 includes a forward wall 131, an aft wall 132, and an axial wall 133. The forward wall 131 and the aft wall 132 are each extended through the depth D of the gas flowpath 90 between the longitudinal walls 110. The axial wall 133 is extended along the lengthwise direction L between the forward wall 131 and the aft wall 132. The forward wall 131 and the aft wall 132 are extended between the longitudinal walls 110 along the depth D of the gas flowpath 90. For example, the forward wall 131 and the aft wall 132 may each extend along the height H (FIG. 10A and FIG. 11) defining the depth D of the gas flowpath 90. As another example, the forward wall 131 and the aft wall 132 may each extend along the depth D of the gas flowpath 90 between the first longitudinal wall 111 and the second longitudinal wall 112.

The forward wall 131 of the strut 130 and the upstream face 121 of the inner wall assembly 120 may together define a groove or cavity at which the detonation region 125 is disposed, such as to define a circuit through which the detonation wave 127 propagates. For example, the forward wall 131 may extend from the longitudinal wall 110 from forward of upstream of the upstream face 121 of the inner wall assembly 120. The aft wall 132 may extend from the longitudinal wall 110 from downstream or aft of the upstream face 121. In one embodiment, the aft wall 132 may extend from approximately where the downstream face 122 of the inner wall assembly 120 and the longitudinal wall 110 are coupled.

Referring now to FIG. 11, an exemplary gas flowpath 90 view of the engine 10 from upstream viewed downstream is generally provided. In various embodiments, the strut 130 may extend at least partially tangentially through the gas flowpath 90. For example, referring to the axisymmetric configuration of the engine 10 generally provided in FIG. 11, the strut 130 is extended partially along the circumferential direction C. As another example, the axial wall 133 of the strut 130 is extended at least partially along the circumferential direction C such as to dispose the aft wall 132 at a different circumferential orientation relative to the forward wall 131 each coupled to the axial wall 133. As such, the flow of oxidizer 81(b) and/or the combustion gases 82 (FIG. 9) across the struts 130 may further include a swirl along the circumferential direction C.

Figure 12:
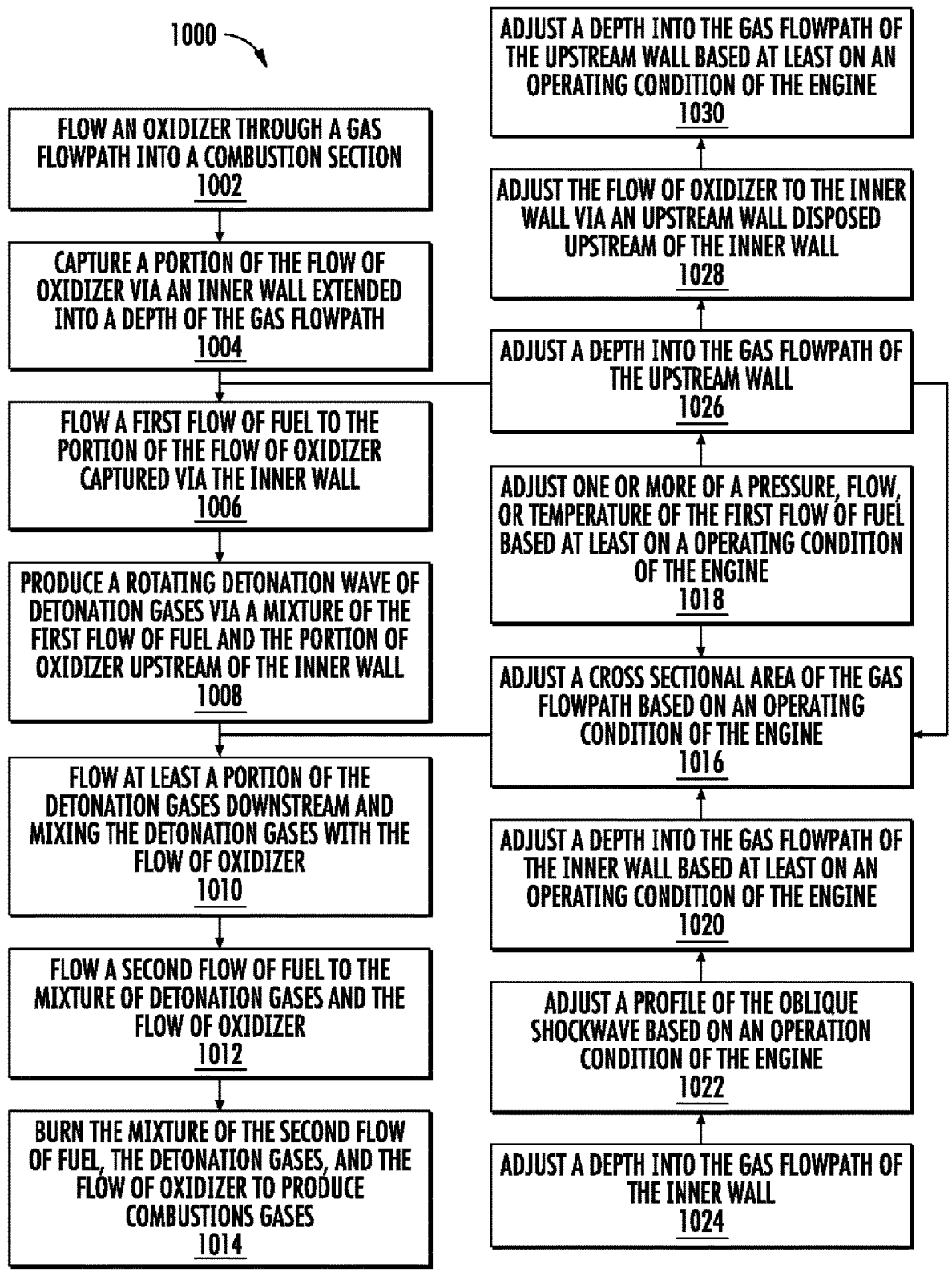
FIG. 12 is a flowchart outlining exemplary steps of a method for operating a Brayton cycle engine.

Referring now to FIG. 12, a flowchart outlining exemplary methods for operating a Brayton cycle engine is generally provided (hereinafter, "method 1000"). The exemplary steps generally provided herein may be implemented in an engine such as described herein in regard to FIGS. 1-11, and further referenced below. Although the steps outlined herein may be presented in a particular order, it should be appreciated that the steps of the method 1000 may be re-ordered, re-arranged, re-sequenced, omitted, or augmented without deviating from the present disclosure.

The method 1000 includes at 1002 flowing an oxidizer (e.g., oxidizer 81) through a gas flowpath (e.g., gas flowpath 90) into a combustion section (e.g., combustion section 100). At 1004, the method 1000 includes capturing a portion of the flow of oxidizer (e.g., oxidizer 81(a)) via an inner wall (e.g., inner wall assembly 120) extended into a depth of the gas flowpath (e.g., depth D of gas flowpath 90). At 1006, the method 1000 includes flowing a first flow of fuel (e.g., fuel 78) to the portion of the flow of oxidizer (e.g., oxidizer 81(a)) captured via the inner wall. At 1008, the method 1000 includes producing a rotating detonation wave (e.g., detonation wave 127) of detonation gases via a mixture of the first flow of fuel and the portion of oxidizer upstream of the inner wall. At 1010, the method 1000 includes flowing at least a portion of the detonation gases (e.g., detonation gases 126) downstream and mixing the detonation gases with the flow of oxidizer (e.g., oxidizer 81(b)). At 1012, the method 1000 includes flowing a second flow of fuel (e.g., fuel 79) to the mixture of detonation gases and the flow of oxidizer. At 1014, the method 1000 includes burning the mixture of the second flow of fuel, the detonation gases, and the flow of oxidizer to produce combustions gases (e.g., combustion gases 82) to produce thrust.

In various embodiments, the method 1000 further includes at 1016 adjusting a cross sectional area of the gas flowpath based on an operating condition of the engine. In one embodiment, adjusting the cross sectional area of the gas flowpath includes at 1018 adjusting one or more of a pressure, flow, or temperature of the first flow of fuel based at least on an operating condition of the engine. In another embodiment, the operating condition of the engine is based at least on a pressure, temperature, or flow rate of the flow of oxidizer at the combustion section.

In still various embodiments, adjusting the cross sectional area of the gas flowpath includes at 1020 adjusting a depth into the gas flowpath of the inner wall based at least on an operating condition of the engine. In one embodiment, adjusting the depth of the inner wall into the gas flowpath is between approximately 0% and approximately 35% of the depth of the gas flowpath. In another embodiment, adjusting the depth of the inner wall into the gas flowpath is further based at least on a desired minimum number of detonation cells to produce the rotating detonation wave.

In one embodiment, burning the mixture of the second flow of fuel, the detonation gases, and the flow of oxidizer to produce thrust comprises a deflagrative combustion process. In another embodiment, the flow of oxidizer at the combustion section defines a supersonic axial velocity through the gas flowpath producing an oblique shockwave from the flow of oxidizer in the gas flowpath.

In various embodiments, the method 1000 further includes at 1022 adjusting a profile of the oblique shockwave based on an operating condition of the engine. In one embodiment, adjusting the profile of the oblique shockwave includes at 1024 adjusting a depth into the gas flowpath of the inner wall. In another embodiment, adjusting the profile of the oblique shockwave includes at 1026 adjusting a depth into the gas flowpath of the upstream wall (e.g., upstream wall assembly 140).

In still various embodiments, the method 1000 further includes at 1028 adjusting the flow of oxidizer to the inner wall via an upstream wall (e.g., upstream wall assembly 140) disposed upstream of the inner wall. In one embodiment, adjusting the cross sectional area of the gas flowpath further includes at 1030 adjusting a depth into the gas flowpath of the upstream wall based at least on an operating condition of the engine.

The embodiments of the engine 10, combustion section 100, and method 1000 generally shown and described herein may improve combustion stabilization of ramjet and scramjet engines and gas turbine engine inter-turbine or afterburner combustion systems. Various embodiments of the engine 10 and combustion section 100 generally provided herein provide an independent aerodynamic structure and method to produce a cross sectional area change across the gas flowpath 90 via modulation or adjustment of an amount of fuel 78 provided to the detonation combustion region 125 versus an amount of fuel 79 provided for conventional or deflagrative combustion downstream of the detonation region 125. For example, the embodiments generally shown and described herein may enable a gas flowpath 90 cross sectional area change over a plurality of operating conditions of the engine 10 (e.g., different pressure, flow rate, temperature, etc. of the flow of oxidizer 81 into the engine 10). As such, the embodiments generally shown and provided may enable the engine 10 to effectually provide a variable volumetric flow rate of the flow of oxidizer 81 (or, more specifically, flow of oxidizer 81(b)) for conventional combustion (i.e., via fuel 79 downstream of the inner wall assembly 120) different from a volumetric flow rate of the flow of oxidizer 81 entering the engine 10 at the inlet section 20.

Additionally, embodiments of the engine 10 and method 1000 may effectuate a cross sectional area change to produce a variable volumetric flow rate of the flow of oxidizer to the combustion section 100 for mixing and combustion with fuel 79 with generally passive or non-moving structures, such as via modulation of the first flow of fuel 78 to mix with a portion of the flow of oxidizer 81(a) to produce detonation gases 126 at the detonation region 125. For example, the inner wall assembly 120 may define a detonation region 125 to capture a portion of the flow of oxidizer 81(a) and produce detonation gases 126. Modulation of the fuel 78 to produce the detonation gases 126 influences or stabilizes the conventional or deflagrative combustion process further downstream via the second flow of fuel 79, the flow of oxidizer 81(b), and mixed with the detonation gases 126.

Additionally, or alternatively, embodiments of the engine 10 may provide active structures to effectuate changes in a cross sectional area of the gas flowpath 90, such as via the upstream wall assembly 140. In conjunction with the inner wall assembly 120 and modulation of the first flow of fuel 78 to the detonation region, the upstream wall assembly 140 may influence or stabilize the downstream conventional or deflagrative combustion process.

Still further, the inner wall assembly 120, the upstream wall assembly 140, or both may define an oblique shockwave from the flow of oxidizer 81 through the gas flowpath 90. For example, the oblique shockwave may increase a pressure or temperature of the flow of oxidizer 81 toward a center of the gas flowpath 90 (e.g., mid-span of depth D). As such, the oblique shockwave further improves or stabilizes the downstream convention or deflagrative combustion process.

Furthermore, the inner wall assembly 120 providing the first flow of fuel 78 to the detonation region 125 may further improve stabilization of the combustion section 100 at relatively low power operating conditions. For example, a relatively low flow of oxidizer 81 into the engine 10 may be utilized to mix with the fuel 78 and produce detonation gases 126 and thrust at conditions that may generally be too low or unstable for a conventional or deflagrative combustion process via the second flow of fuel 79 mixed with the flow of oxidizer 81(b).

Still furthermore, embodiments of the combustion section 100 generally provided herein may decrease a lengthwise dimension of the engine 10 via improved combustion performance and stability. As such, embodiments of the engine 10, such as ramjet, scramjet, inter-turbine burner, or afterburner/augmentor systems may be improved or integrated into applications heretofore generally limited by known sizes or lengths of such engines or apparatuses to which the engine is installed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An engine, the engine comprising:
   a longitudinal wall extended along a lengthwise direction, wherein the longitudinal wall defines a gas flowpath of the engine and a combustion section, the gas flowpath having a gas flowpath depth perpendicular to the longitudinal wall;
   an inner wall assembly extendable from the longitudinal wall into the gas flowpath, wherein the inner wall assembly includes a concave upstream face that defines a rotating detonation combustion region at an upstream side of the inner wall assembly and adjacent to the longitudinal wall, and the inner wall assembly includes a first actuator configured to actuate the inner wall assembly to extend the inner wall assembly into the gas flowpath depth; and
   an upstream wall assembly coupled to the longitudinal wall upstream of the inner wall assembly, wherein a second actuator is coupled to the upstream wall assembly, the second actuator configured to actuate the upstream wall assembly to extend the upstream wall assembly into the gas flowpath depth; and
   wherein the engine is configured to perform operations comprising;
      flowing an oxidizer through the gas flowpath into the combustion section, wherein the flow of oxidizer includes a first portion and a second portion;
      capturing the first portion of the flow of oxidizer at the rotating detonation combustion region via the concave upstream face of the inner wall assembly being extended into the gas flowpath a depth;
      adjusting an amount and flow direction of the first portion of the flow of oxidizer provided to the concave upstream face of the inner wall assembly via actuating the upstream wall assembly via the second actuator to adjust the depth of the upstream wall assembly extended into the gas flowpath and to adjust the flow direction of the first portion of the flow of oxidizer;
      flowing a first flow of fuel to the first portion of the flow of oxidizer at the rotating detonation combustion region;
      producing, via a first mixture of the first flow of fuel and the first portion of the flow of oxidizer, a rotating detonation wave of detonation gases at the rotating detonation combustion region;
      adjusting a size of the rotating detonation wave at the rotating detonation combustion region by adjusting a depth of the inner wall assembly extended into the gas flowpath via the first actuator;
      mixing at least a portion of the detonation gases from the rotating detonation combustion region with a second flow of fuel and the second portion of the flow of oxidizer in the gas flowpath; and burning a second mixture comprising the second flow of fuel, at least a portion of the detonation gases, and the second portion of the flow of oxidizer, wherein burning the second mixture is downstream of the rotating detonation wave of detonation gases relative to the gas flowpath.

2. The engine of claim 1, wherein the rotating detonation combustion region is positioned along the lengthwise direction between the upstream wall assembly and the inner wall assembly.

3. The engine of claim 1,
wherein the first actuator is configured to adjust a cross sectional area of the gas flowpath by adjusting the depth of the rotating detonation combustion region into the gas flowpath.

4. The engine of claim 1, wherein the engine comprises a supersonic combustion ramjet engine.

5. The engine of claim 1, wherein the longitudinal wall comprises a first fuel injection port, the first fuel injection port configured to provide the first flow of fuel to the rotating detonation combustion region.

6. The engine of claim 1, wherein the inner wall assembly further comprises:
a downstream face extended from the longitudinal wall and coupled to the concave upstream face, wherein the downstream face is disposed at an angle relative to the longitudinal wall.

7. The engine of claim 6, wherein the first actuator adjusts the angle of the downstream face relative to the longitudinal wall.

8. The engine of claim 6, wherein the longitudinal wall or the concave upstream face of the inner wall assembly comprises a first fuel injection port, the first fuel injection port configured to provide the first flow of fuel to the rotating detonation combustion region.

9. The engine of claim 6, wherein the downstream face of the inner wall assembly defines a first fuel injection port providing the second flow of fuel.

10. The engine of claim 1, wherein the combustion section comprises a deflagrative combustion process downstream of the rotating detonation combustion region relative to the flow of oxidizer in the gas flowpath.

11. The engine of claim 1, wherein the adjusting the amount of the first portion of the flow of oxidizer provided to the concave upstream face of the inner wall assembly is based at least on an operating condition of the engine.

12. The engine of claim 11, wherein the operating condition of the engine is based at least on pressure, temperature, or flow rate of the flow of oxidizer at the combustion section.

13. The engine of claim 12, wherein the engine comprises a supersonic combustion ramjet engine.

14. The engine of claim 13, wherein the flowing of the oxidizer to the combustion section comprises a supersonic axial velocity through the gas flowpath producing an oblique shockwave in the gas flowpath.

15. The engine of claim 14, wherein the engine further performs adjusting a profile of the oblique shockwave based on the operating condition of the engine.

16. The engine of claim 15, wherein the adjusting the profile of the oblique shockwave comprises adjusting the depth of the upstream wall assembly extended into the gas flowpath.

17. The engine of claim 1, wherein the adjusting the amount of the first portion of the flow of oxidizer is based at least on a desired minimum number of detonation cells to produce the rotating detonation wave.

18. The engine of claim 1, wherein the burning of the second mixture comprises a deflagrative combustion process.

* * * * *